(12) United States Patent
Johnson

(10) Patent No.: US 10,371,521 B2
(45) Date of Patent: Aug. 6, 2019

(54) SYSTEMS AND METHODS FOR A FOUR-MASS VIBRATING MEMS STRUCTURE

(71) Applicant: Honeywell International Inc., Morris Plains, NJ (US)

(72) Inventor: Burgess R. Johnson, Bloomington, MN (US)

(73) Assignee: Honeywell International Inc., Morris Plains, NJ (US)

( * ) Notice: Subject to any disclaimer, the term of this patent is extended or adjusted under 35 U.S.C. 154(b) by 173 days.

(21) Appl. No.: 15/466,784

(22) Filed: Mar. 22, 2017

(65) Prior Publication Data
US 2018/0231384 A1 Aug. 16, 2018

Related U.S. Application Data

(60) Provisional application No. 62/342,136, filed on May 26, 2016.

(51) Int. Cl.
*G01C 19/574* (2012.01)
*G01C 19/5656* (2012.01)
(Continued)

(52) U.S. Cl.
CPC ..... *G01C 19/5747* (2013.01); *G01C 19/5656* (2013.01); *G01C 19/574* (2013.01); *G01C 19/5712* (2013.01)

(58) Field of Classification Search
CPC ............ G01C 19/5656; G01C 19/5642; G01C 19/5712; G01C 19/574; G01C 19/5719; G01C 19/5747; G01C 19/56
See application file for complete search history.

(56) References Cited

U.S. PATENT DOCUMENTS 5,349,855 A 9/1994 Bernstein et al.
6,151,965 A 11/2000 Watarai
(Continued)

FOREIGN PATENT DOCUMENTS

CA 2548728 10/2009
CA 2756485 8/2018
(Continued)

OTHER PUBLICATIONS

Zhang et al, "Optimal Design of a Center Support Quadruple Mass Gyroscope (CSQMG)", Sensors, Apr. 28, 2016, pp. 1-16, Publisher: MDPI.
(Continued)

*Primary Examiner* — Helen C Kwok
(74) *Attorney, Agent, or Firm* — Fogg & Powers LLC

(57) ABSTRACT

Systems and methods for a four-mass vibrating mems structure are provided. In certain implementations, a MEMS sensor includes four proof masses, wherein each proof mass is driven such that the proof masses oscillate along radial lines extending from the center of the MEMS sensor through the center of the respective proof mass, each proof mass comprising a plurality of drive combs; and a plurality of sense combs. In further embodiments, the MEMS sensor includes at least one substrate having one or more drive electrodes for driving the four proof masses along the radial lines at a drive frequency, wherein a resonant frequency of a sense mode is different from the drive frequency.

16 Claims, 7 Drawing Sheets

(51) Int. Cl.
*G01C 19/5712* (2012.01)
*G01C 19/5747* (2012.01)

(56) References Cited

U.S. PATENT DOCUMENTS

| | | | |
|---|---|---|---|
| 6,308,567 | B1 | 10/2001 | Higuchi et al. |
| 6,742,390 | B2 | 6/2004 | Mochida et al. |
| 6,837,107 | B2 | 1/2005 | Geen |
| 6,848,304 | B2 | 2/2005 | Geen |
| 7,032,451 | B2 | 4/2006 | Geen |
| 7,036,373 | B2 | 5/2006 | Johnson et al. |
| 7,100,446 | B1 | 9/2006 | Acar et al. |
| 7,401,397 | B2 | 7/2008 | Shcheglov et al. |
| 7,810,394 | B2 | 10/2010 | Yazdi |
| 7,905,146 | B2 | 3/2011 | Suzuki |
| 8,006,557 | B2 | 8/2011 | Yin et al. |
| 8,113,050 | B2 | 2/2012 | Acar et al. |
| 8,256,290 | B2* | 9/2012 | Mao .............. G01C 19/5719 73/488 |
| 8,322,213 | B2 | 12/2012 | Trusov et al. |
| 8,342,023 | B2 | 1/2013 | Wolfram et al. |
| 8,347,717 | B2 | 1/2013 | Seeger et al. |
| 8,429,970 | B2 | 4/2013 | Rocchi |
| 8,459,110 | B2* | 6/2013 | Cazzaniga ........ G01C 19/5747 73/504.12 |
| 8,479,575 | B2* | 7/2013 | Kempe ............ G01C 19/5747 73/504.12 |
| 8,544,594 | B2 | 10/2013 | Yacine |
| 8,640,541 | B2 | 2/2014 | Aziz et al. |
| 8,661,897 | B2 | 3/2014 | Coronato et al. |
| 8,661,898 | B2 | 3/2014 | Watson |
| 8,733,172 | B2 | 5/2014 | Coronato et al. |
| 8,789,416 | B2 | 7/2014 | Rocchi |
| 8,794,066 | B2 | 8/2014 | Merz et al. |
| 9,157,740 | B2 | 10/2015 | Kempe |
| 9,194,704 | B2* | 11/2015 | Lin .................... G01C 19/5747 |
| 9,322,213 | B2 | 4/2016 | Wang et al. |
| 2006/0032310 | A1 | 2/2006 | Merassi et al. |
| 2009/0064781 | A1 | 3/2009 | Ayazi et al. |
| 2009/0192403 | A1 | 7/2009 | Gharib et al. |
| 2010/0095768 | A1 | 4/2010 | Acar et al. |
| 2010/0107391 | A1 | 5/2010 | Lasalandra et al. |
| 2010/0223996 | A1 | 9/2010 | Fukumoto |
| 2010/0313657 | A1 | 12/2010 | Trusov et al. |
| 2011/0270569 | A1 | 11/2011 | Stephanou et al. |
| 2011/0303007 | A1* | 12/2011 | Rocchi ............. G01C 19/5712 73/504.09 |
| 2012/0017677 | A1 | 1/2012 | Merz et al. |
| 2012/0024056 | A1* | 2/2012 | Hammer ......... G01C 19/5712 73/504.02 |
| 2012/0031977 | A1* | 2/2012 | Havens ............ G06K 7/10712 235/472.01 |
| 2012/0048017 | A1 | 3/2012 | Kempe |
| 2012/0210788 | A1 | 8/2012 | Günther et al. |
| 2012/0291548 | A1 | 11/2012 | Kanemoto |
| 2013/0031977 | A1 | 2/2013 | Kempe |
| 2013/0098153 | A1 | 4/2013 | Trusov et al. |
| 2013/0125649 | A1 | 5/2013 | Simoni et al. |
| 2013/0167636 | A1* | 7/2013 | Coronato ............. G01C 19/42 73/504.12 |
| 2013/0192363 | A1 | 8/2013 | Loreck et al. |
| 2013/0192365 | A1 | 8/2013 | Zhuang et al. |
| 2013/0283908 | A1 | 10/2013 | Geen et al. |
| 2014/0047921 | A1 | 2/2014 | Seeger et al. |
| 2014/0116135 | A1 | 5/2014 | Cazzaniga et al. |
| 2014/0116136 | A1 | 5/2014 | Coronato et al. |
| 2014/0352431 | A1 | 12/2014 | Leclerc |
| 2015/0211854 | A1* | 7/2015 | Ruohio ............ G01C 19/5712 73/504.12 |
| 2015/0377621 | A1 | 12/2015 | Chaumet et al. |
| 2016/0025492 | A1 | 1/2016 | Rocchi |
| 2016/0084654 | A1 | 3/2016 | Senkal et al. |

FOREIGN PATENT DOCUMENTS

| | | |
|---|---|---|
| CN | 101261126 B | 6/2010 |
| CN | 101363731 B | 1/2011 |
| CN | 201945318 U | 8/2011 |
| CN | 102305626 A | 1/2012 |
| CN | 102636162 A | 8/2012 |
| CN | 202793402 U | 3/2013 |
| CN | 102278982 B | 7/2013 |
| CN | 103217151 A | 7/2013 |
| CN | 103575263 A | 2/2014 |
| CN | 103213939 B | 1/2016 |
| EP | 786645 A2 | 7/1997 |
| EP | 1432962 A1 | 6/2004 |
| EP | 1603830 A1 | 12/2005 |
| EP | 1899681 B1 | 5/2009 |
| EP | 1697696 B1 | 1/2010 |
| EP | 2160566 B1 | 12/2011 |
| EP | 3187825 A1 | 7/2017 |
| JP | 2008145325 A | 6/2008 |
| JP | 2010096695 A | 4/2010 |
| JP | 4702942 B2 | 6/2011 |
| JP | 5030135 B2 | 9/2012 |
| RU | 2222780 C1 | 1/2004 |
| RU | 2234679 C2 | 8/2004 |
| RU | 2251077 C1 | 4/2005 |
| RU | 2423668 C1 | 7/2011 |
| WO | 2009003541 A1 | 1/2009 |
| WO | 2009107573 A1 | 9/2009 |
| WO | 2011136970 A1 | 11/2011 |
| WO | 2013083534 A2 | 6/2013 |
| WO | 2013091866 A1 | 6/2013 |
| WO | 2013108804 A1 | 7/2013 |

OTHER PUBLICATIONS

Zhou et al, "Innovation of Flat Gyro: Center Support Quadruple Mass Gyroscope", 2016, pp. 1-4, Publisher: IEEE.
European Patent Office, "Extended Search Report for EP Application No. 17162684.9", Foreign Counterpart to U.S. Appl. No. 15/466,778, dated Sep. 25, 2017, pp. 1-8, Published in: EP.
European Patent Office, "Extended European Search Report for EP Application No. 17162859.7", Foreign Counterpart to U.S. Appl. No. 15/466,784, dated Sep. 26, 2017, pp. 1-9, Published in: EP.
Senkal et al., "Minimal Realization of Dynamically Balanced Lumped Mass WA Gyroscope: Dual Foucault Pendulum", "MicroSystems Laboratory, University of California", 2015, pp. 1-2, Publisher: IEEE, Published in: Irvine, CA, USA.
Zhang et al., "Optimal Design of a Center Support Quadruple Mass Gyroscope (CSQMG)", "Engineering Research Center for Navigation Technology, Department of Precision Instruments", Apr. 28, 2016, pp. 1-16, vol. 16, No. 613, Publisher: Sensors 2016, Published in: Tsinghua University, Beijing 100084, China.
Zhou et al., "Innovationn of Flat Gyro: Center Support Quadruple Mass Gyroscope", "2016 IEEE International Symposium on Inertial Sensors and Systems", Mar. 21, 2016, pp. 1-4, Publisher: Date of Conference: Feb. 22-25, 2016.
European Patent Office, "European Office Action Communication pursuant to Article 94(3) from EP Application No. 17162859.7 dated Aug. 17, 2018", from Foreign Counterpart of U.S. Appl. No. 15/466,784, dated Aug. 17, 2018, pp. 1-6, Published in: EP.
European Patent Office, "European Office Action Communication pursuant to Article 94(3) from EP Application No. 17162684.9 dated Nov. 14, 2018", from Foreign Counterpart of U.S. Appl. No. 15/466,778, dated Nov. 14, 2018, pp. 1-8, Published in: EP.
United States Patent and Trademark Office, Non-Final Office Action from U.S. Appl. No. 15/466,778 dated Nov. 13, 2018, pp. 1-19, Published in: US.

* cited by examiner

SYSTEMS AND METHODS FOR A FOUR-MASS VIBRATING MEMS STRUCTURE

CROSS REFERENCE TO RELATED APPLICATIONS

This application claims the benefit of U.S. Provisional Patent Application Ser. No. 62/342,136, filed on May 26, 2016, which is hereby incorporated herein by reference.

STATEMENT REGARDING FEDERALLY SPONSORED RESEARCH OR DEVELOPMENT

This invention was made with Government support under Government Contract Number HR0011-16-9-0001 awarded by DARPA. The Government has certain rights in the invention.

BACKGROUND

Certain navigational applications have a need for high precision sensors. For example, MEMS vibratory sensors may be capable of providing high precision measurements. MEMS vibratory sensors may consist of one or more proof masses connected to a substrate through flexible suspensions (flexures) such that the MEMS sensor has two resonant modes. A velocity induced by driving the proof masses along the first resonant mode (drive mode) produces a Coriolis force on the second mode (sense mode) when the substrate is rotated. The resulting displacement of the sense mode at the drive frequency provides an output of the sensor, which is a measure of the rotation rate. Alternatively, the output of a force rebalance control loop that nulls the sense mode displacement may also provide a measure of the rotation rate.

A common sensor output error is bias or zero-rate offset. A bias error occurs when the sensor output is non-zero when there is no substrate rotation. Systems may be able to compensate for the bias error if the bias is repeatable due to environmental conditions, such as temperature, that vary in a repeatable manner. However, there may be some level of error that is non-compensatable such as bias due to hysteresis or stress relaxation in materials, non-zero thermal time constants, aging of electronics components, or other factors.

One cause of non-compensatable bias error is due to mechanical coupling of the sensor to a substrate. Imperfect fabrication of the sensor, which may include imperfect coupling of the sensor and substrate, may cause the driven motion of the drive mode to be asymmetric, producing a net force and/or moment on the substrate. The imbalanced force or moment exerted on the substrate can produce motion in structures external to the sensor. This external motion can in turn exert a force and/or moment on the sense mode of the sensor, producing a bias signal at the sensor output. If the external motion and/or the mechanical coupling of the substrate to the sensor has non-repeatable variation over changes in temperature, then the compensated bias of the sensor may not account for the non-repeatable variation.

Typical two-mass MEMS sensors, known to one having skill in the art, have substantial non-compensatable bias because the sense mode motion has net angular momentum. Thus, sense mode motion can be produced by rotational vibration of the substrate even if the gyroscope is perfectly fabricated.

SUMMARY

Systems and methods for a four-mass vibrating mems structure are provided. In certain implementations, a MEMS sensor includes four proof masses, wherein each proof mass is driven such that the proof masses oscillate along radial lines extending from the center of the MEMS sensor through the center of the respective proof mass, each proof mass comprising a plurality of drive combs; and a plurality of sense combs. In further embodiments, the MEMS sensor includes at least one substrate having one or more drive electrodes for driving the four proof masses along the radial lines at a drive frequency, wherein a resonant frequency of a sense mode is different from the drive frequency.

DRAWINGS

Understanding that the drawings depict only exemplary embodiments and are not therefore to be considered limiting in scope, the exemplary embodiments will be described with additional specificity and detail through the use of the accompanying drawings, in which.

Figure 1:
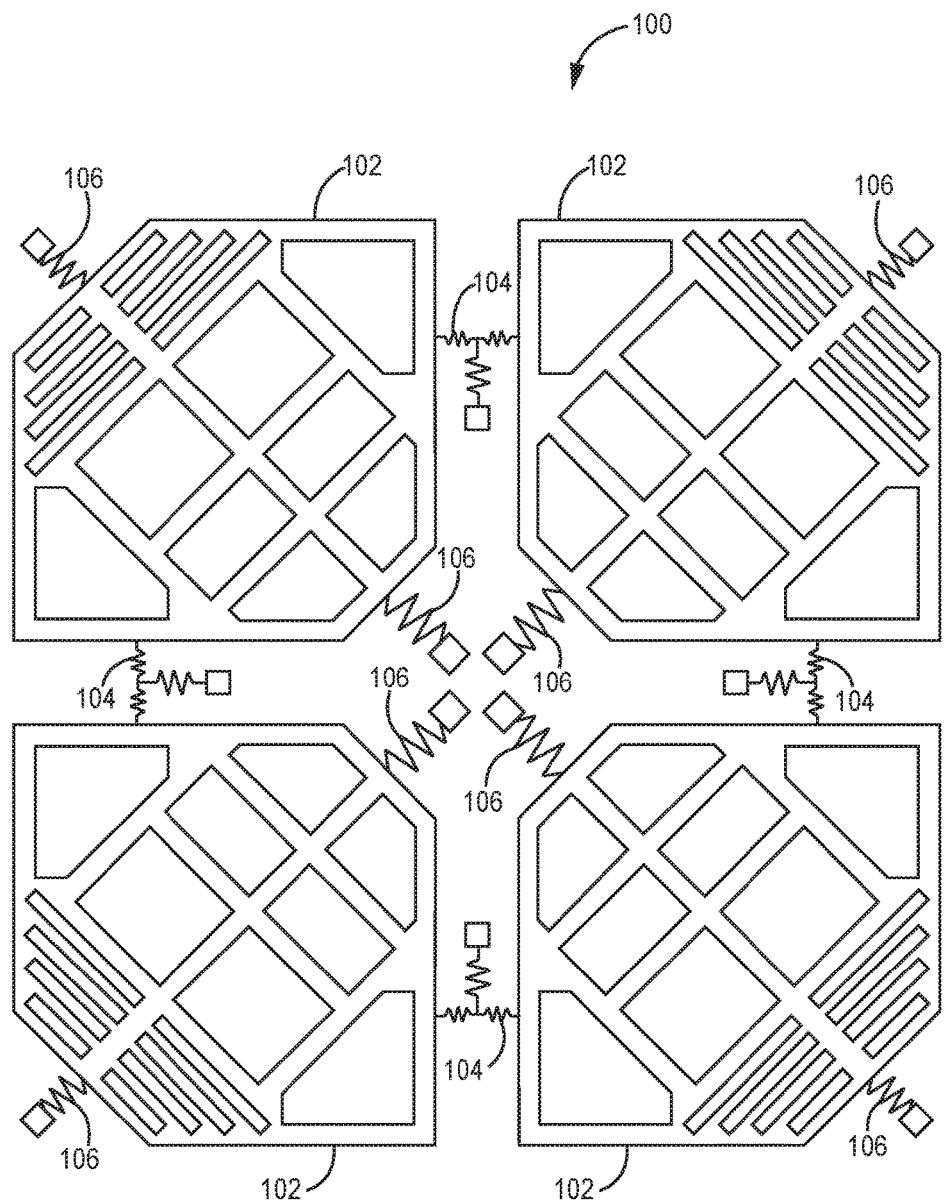
FIG. 1 is a diagram of a MEMS sensor having four proof masses in accordance with embodiments described herein.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

Systems and methods described herein illustrate a MEMS sensor that has reduced sensitivity to linear and rotational vibrations of the substrate at the drive frequency of the MEMS sensor. As described herein, a MEMS sensor may include four proof masses that are arranged symmetrically around the center of the MEMS sensing mechanism. For example, the four proof masses may be fabricated within a silicon layer, where the four masses are coupled to one another by a series of flexures. Each of the proof masses may have mirror symmetry about a line passing through its center of mass and the center of the sensor mechanism. The masses are driven to oscillate radially at the drive mode resonant frequency. The symmetries of each mass, flexures, and each of its adjacent masses may ensure that the drive mode motion of each mass is linear along a line from its center of mass to the center of the sensor mechanism.

Rotation of the substrate about an axis that extends out of the plane formed by the proof masses in the MEMS sensor at a slowly varying or slowly oscillating rate produces a Coriolis force on each mass. The Coriolis force excites sense mode motion of the proof masses that is perpendicular to the drive mode motion. The sense mode motion is sensed by sense combs within each of the four masses. The sense combs may be oriented such that the gap between adjacent comb fingers does not vary during drive motion, up to large drive mode displacements, e.g. 10-40 µm. The constant gap may be ensured by the linear motion of the drive mode, which is a result of the symmetry of the masses and flexures. Large drive mode displacement may aid in providing high sensitivity of the gyroscope to an input angular rate. A constant gap between adjacent comb fingers during drive motion allows the gap to be small, which aids in providing high pickoff sensitivity of sense mode motion. The sense mode may also be linear, and the sense mode displacement is typically less than that of the drive mode.

FIG. 1 shows a MEMS sensor 100 having four proof masses 102. The MEMS sensor 100 having four proof masses is insensitive to linear and rotational vibration of the substrate at the drive frequency. In at least one implementation, the MEMS sensor 100 may be a Coriolis vibratory gyroscope. As illustrated, the four proof masses 102 may be substantially identical and arranged symmetrically around the center of the MEMS sensor 100. The four proof masses 102 are coupled to adjacent proof masses through proof mass flexures 104. Also, each of the four proof masses 102 is coupled to a supportive substrate through substrate flexures 106. Further, the proof mass flexures 104 may also be coupled to the supportive substrate. In certain implementations, the masses and flexures may be fabricated from a single silicon layer. In further implementations, the single silicon layer may be of uniform thickness.

In at least one implementation, each proof mass 102 may have mirror symmetry about a line passing through the center of the proof mass 102 and the center of the MEMS sensor 100. The proof masses 102 may be driven to oscillate radially at the drive mode resonant frequency. The symmetries of each of the proof masses 102, and the flexures 104 and 106, may ensure that the drive mode motion of each proof mass 102 is linear along a line from the center of mass towards the center of the MEMS sensor 100. As is apparent from the above description, each of the four proof masses 102 serve as both a driven mass and a sensing mass.

Figure 2A:
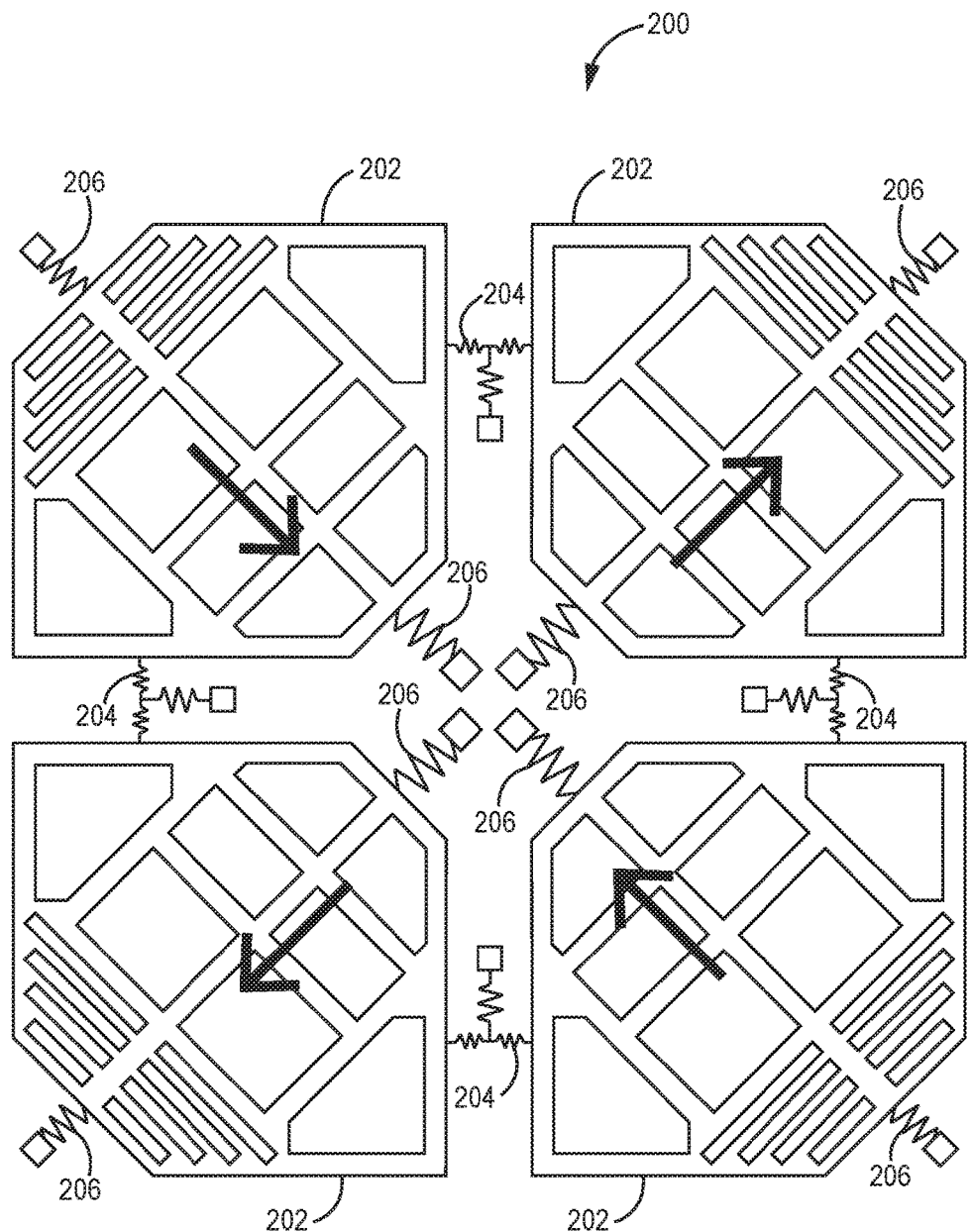
FIG. 2A is a diagram of a MEMS sensor having four proof masses where the proof masses are driven along radial lines in accordance with embodiments described herein.
Figure 3:
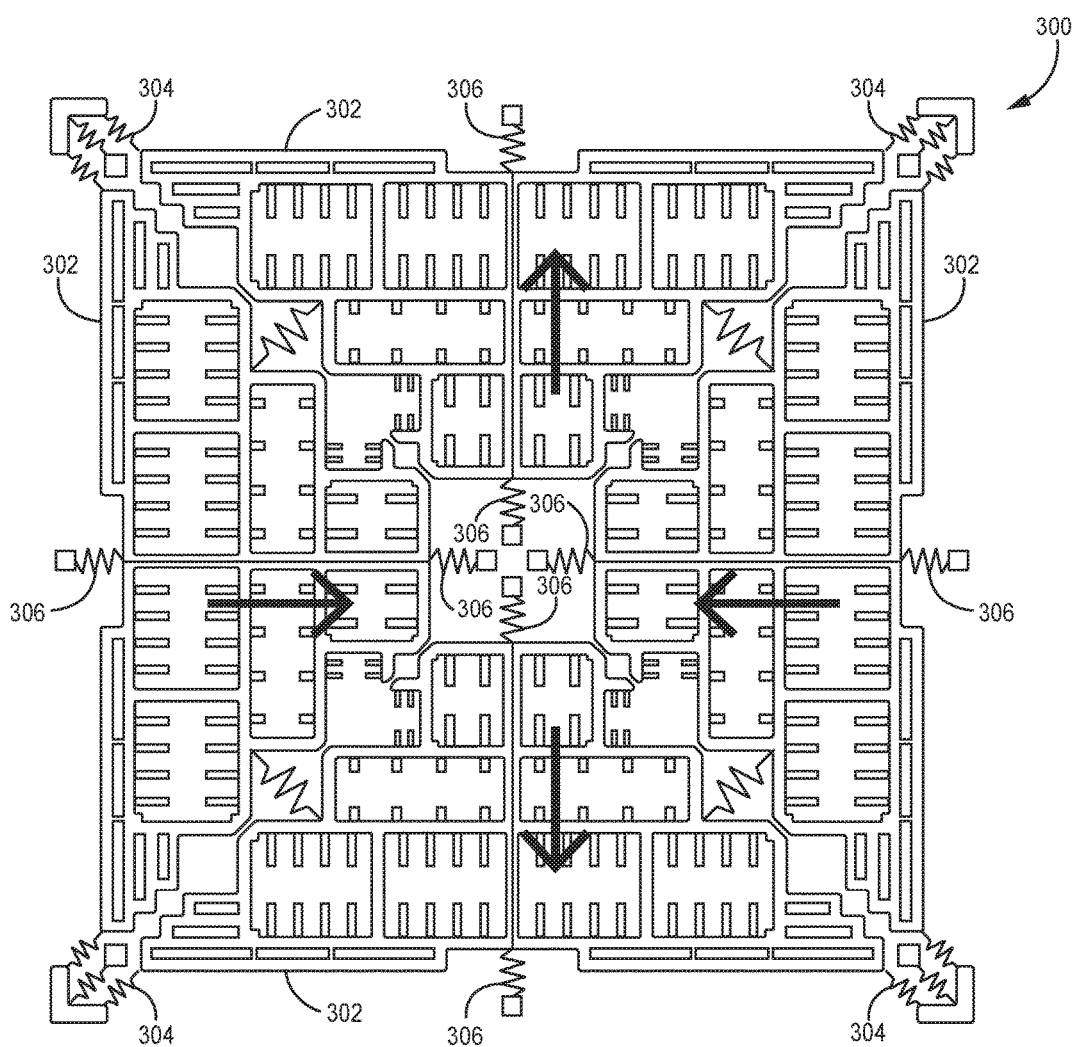
FIG. 3 is a diagram of a MEMS sensor having four proof masses where the proof masses are driven along radial lines in accordance with embodiments described herein.

FIG. 2A illustrates the drive mode motion of each proof mass 202 for a MEMS sensor 200. As illustrated, the proof masses 202 may oscillate such that adjacent proof masses 202 move along radial lines out of phase with one another. As illustrated, proof mass flexures 204 and substrate flexures 206 are substantially similar to proof mass flexures 104 and substrate flexures 106 in FIG. 1. Further, when a proof mass 202 moves toward the center of the MEMS sensor 200, adjacent proof masses 202 move away from the center of the MEMS sensor 200. Accordingly, oppositely positioned proof masses 202 move towards and away from the center of MEMS sensor 200 at substantially the same time. The drive mode motion in FIG. 2A has zero total linear momentum and zero total angular momentum. Therefore, there is zero total force and zero total moment exerted on the substrate, resulting in minimal induced substrate vibration. FIG. 3 represents an alternative embodiment of a MEMS sensor 300 illustrating the drive mode motion of each proof mass 302 for the MEMS sensor 300, where the proof masses 302 may oscillate such that the adjacent proof masses 302 move along radial lines out of phase with one another.

Figure 2B:
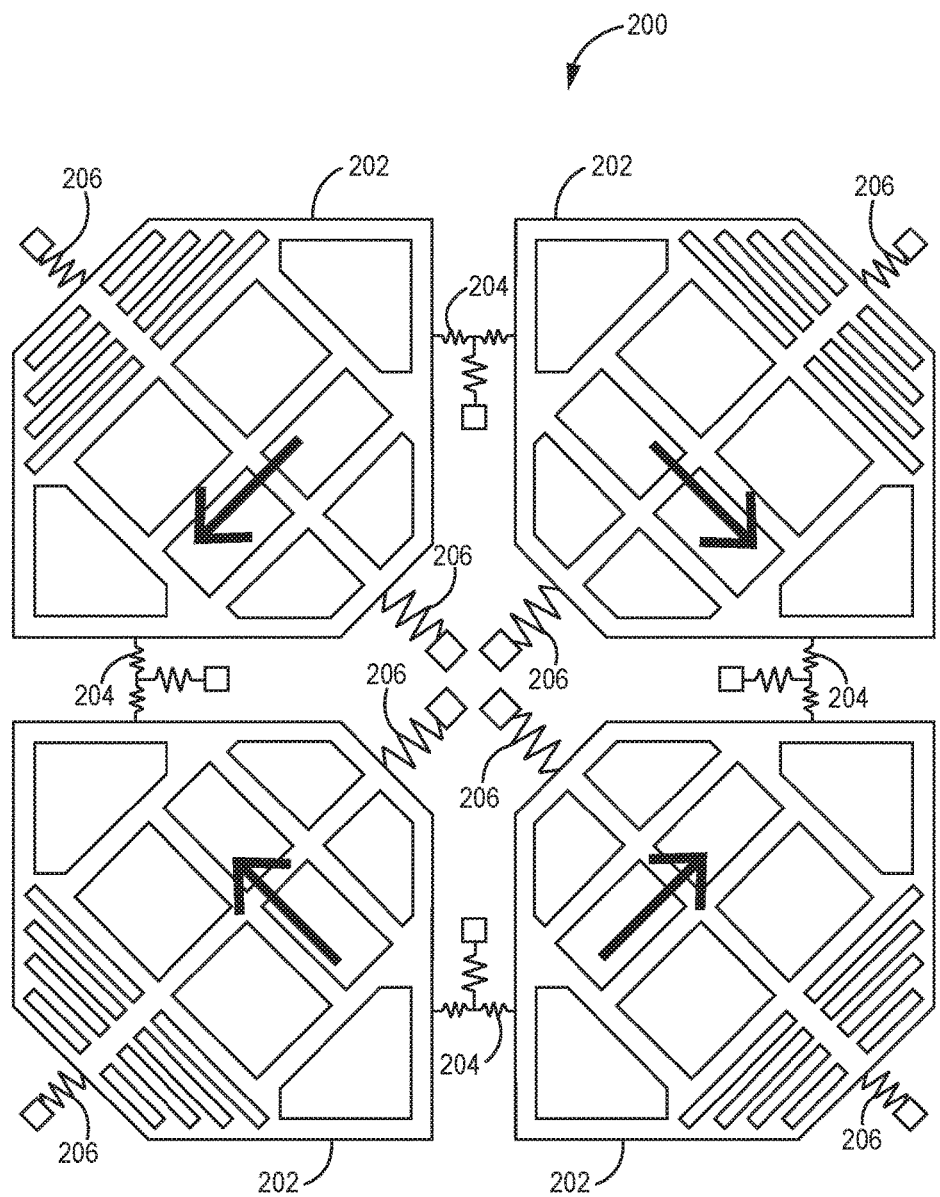
FIG. 2B is a diagram of a MEMS sensor having four proof masses where the MEMS sensor experiences rotation in accordance with embodiments described herein.

FIG. 2B is a diagram of a MEMS sensor 200 that is experiencing rotational motion while being driven according to FIG. 2A. As illustrated, proof mass flexures 204 and substrate flexures 206 are substantially similar to proof mass flexures 104 and substrate flexures 106 in FIG. 1. As the MEMS sensor 200 experiences rotation of the substrate about an axis that extends perpendicular to the plane formed by the proof masses at a slowly varying or slowly oscillating rate (oscillation frequency much less than the drive frequency) a Coriolis force is produced on each proof mass 202. The Coriolis force may excite sense mode motion as shown by the arrows that are perpendicular to the lines that extend through the center of the proof mass towards the center of the MEMS sensor 200. The sense mode motion is sensed by sense combs that are located within each of the four proof masses 202. In certain implementations, the sense combs may be oriented such that the gap between adjacent comb fingers does not vary during drive motion. The non-varying gap between the adjacent comb fingers may be ensured by the linear motion of the drive mode. The sense mode motion in FIG. 2B has zero total linear momentum and zero total angular momentum. Therefore, there is zero total force and zero total moment exerted on the substrate. As a result, linear or rotational substrate vibration does not produce sense mode motion. Accordingly, the sensor output is insensitive to linear and rotational substrate vibration.

In certain implementations, the resonant frequency of the sense mode is not equal to the resonant frequency of the drive mode. For example, the difference between the drive and sense resonant frequencies may be 100-1000 Hz and the drive resonant frequency may be 10-20 kHz, though the respective frequencies may be higher or lower. The non-zero separation between the resonant frequencies may provide several advantages. For example, the non-zero separation allows a wide sensor bandwidth, no need for closed loop control of the rate output of the gyroscope, and reduced sensitivity to variations in mode frequencies caused by fabrication variations, which may result in a high fabrication yield.

Figure 4:
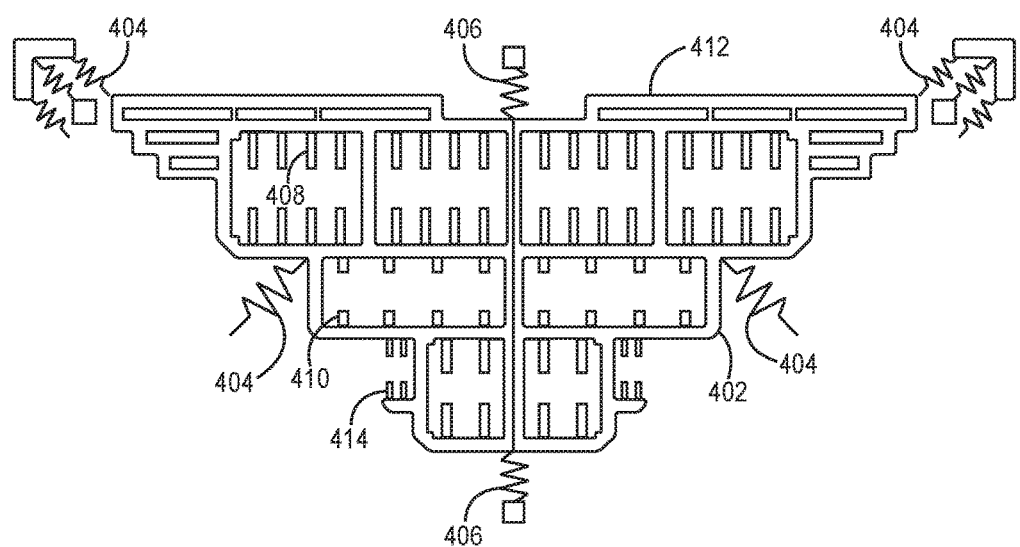
FIG. 4 is a diagram of a proof mass in accordance with embodiments described herein.

FIG. 4 illustrates a single proof mass 402 that is used as part of a four mass MEMS sensor. As illustrated here and above, the proof mass 402 may be coupled to other proof masses in the MEMS sensor through proof mass flexures 404 and coupled to the substrate through substrate flexures 406. The proof mass 402 may include drive combs 412, sense combs 408 and quadrature force rebalance combs 410, and drive pickoff combs 414. In certain implementations, the drive combs 412 are similar to the drive combs discussed in U.S. Pat. No. 7,036,373, which is titled "MEMS GYROSCOPE WITH HORIZONTALLY ORIENTED DRIVE ELECTRODES", patented May 2, 2006, which is incorporated herein by reference. The various combs interact with electrodes to acquire measurements about the movement of the proof mass 402 and to drive the movement of the proof mass 402. In at least one implementation, the drive electrodes may be deposited onto the substrate while other electrodes may be silicon combs attached to the substrate but residing above the substrate.

Figure 5:
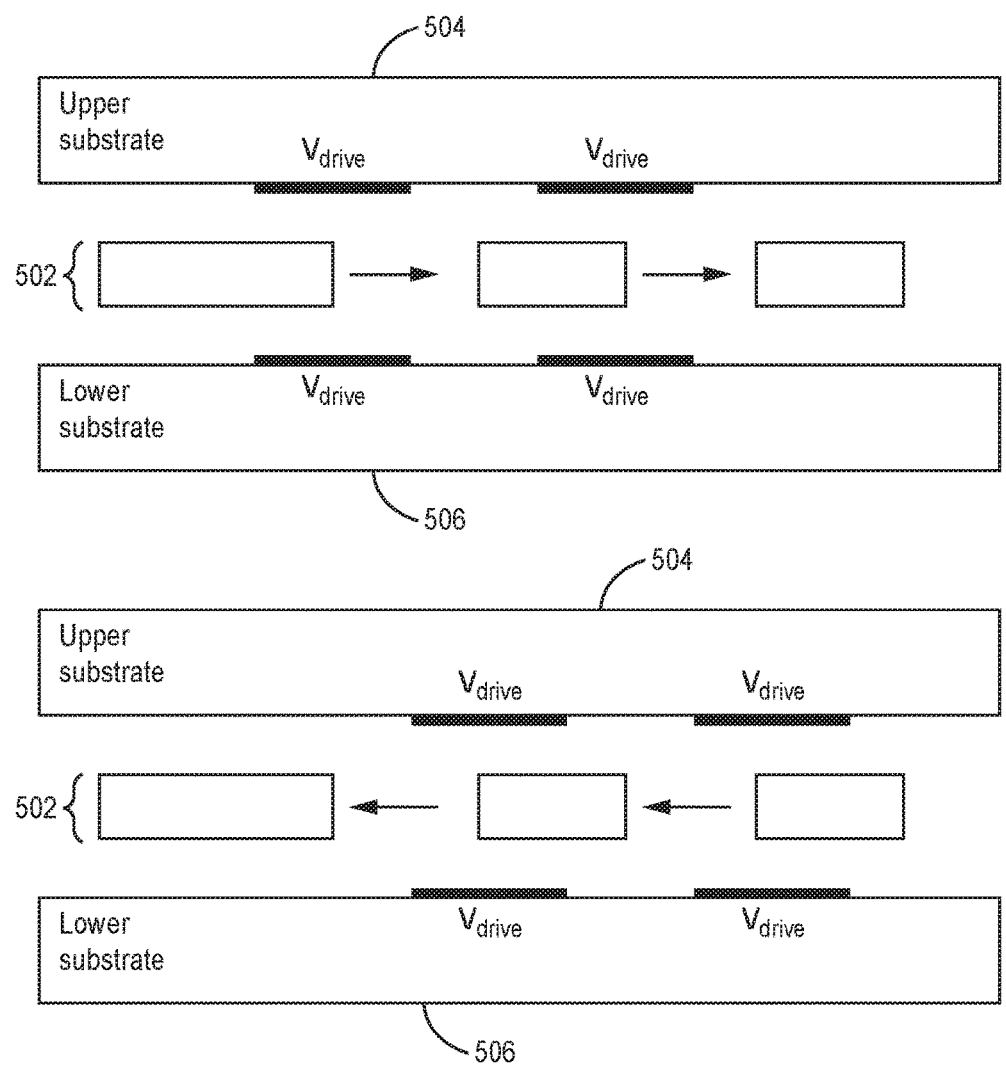
FIG. 5 is a cross section diagram of substrates driving motion of proof masses in accordance with embodiments described herein.

As illustrated in FIG. 5, gyroscope masses 502 may be sandwiched between an upper substrate 504 and a lower substrate 506, where the substrates are typically glass with patterned metal and dielectric layers. The masses 502 may be driven by horizontal drive combs using electrodes on the upper substrate 504 and lower substrate 506, such that there is no drive force in the direction of the sense motion (the direction of sense motion is out of the plane of the paper in FIG. 5). Drive electrodes can be arranged relative to a mass to provide either radially outward or radially inward electrostatic force on the mass, as shown in FIG. 5. Thus, all four masses 502 may be driven with the same phase of sinusoidal drive voltage. Typically, the sinusoidal drive voltages are at half the drive resonant frequency, providing electrostatic forces at the drive resonant frequency. Because the electrostatic force on the proof masses is proportional to the square of the drive voltage, sinusoidal drive voltages having phases of 0° and 180° provide equivalent electrostatic force. The use of drive voltages with phases of 0° and 180° may provide cancellation of electrical currents injected into the masses by the drive voltages.

Alternatively, four phases of drive voltage (0°, 90°, 180°, and 270°) at half the drive resonant frequency could be used, with all four masses having identical arrangements of drive electrodes relative to the masses. The drive-frequency forces provided by the 0° and 180° voltages would be out-of-phase with the drive-frequency forces provided by the 90° and 270° voltages. The 0° and 180° voltages may be applied to electrodes for two of the masses that move radially inward simultaneously, while the 90° and 270° voltages may be applied to electrodes for the other two masses. Using four phases of drive voltage allows similar drive electrodes for all four masses, for improved symmetry.

Figure 6:
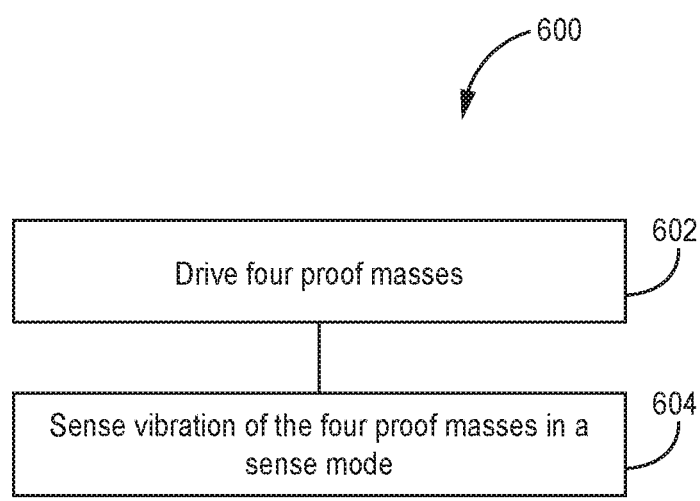
FIG. 6 is a flow diagram of a method for driving motion of four proof masses in accordance with embodiments described herein.

FIG. 6 is a flow diagram of a method 600 for operating a MEMS sensor. Method 600 proceeds at 602, where four proof masses are driven. For example, each proof mass is driven by a plurality of drive combs, such that the four proof masses oscillate at a drive frequency along radial lines extending from the center of the MEMS sensor through the center of the respective proof mass. Further, method 600 proceeds at 604, where vibration of the four proof masses is sensed in a sense mode. In certain implementations, the resonant frequency of the sense mode may be different from the drive frequency.

Example Embodiments

Example 1 includes a MEMS sensor, the MEMS sensor comprising: four proof masses, wherein each proof mass is driven such that the proof masses oscillate along radial lines extending from the center of the MEMS sensor through the center of the respective proof mass, each proof mass comprising: a plurality of drive combs; and a plurality of sense combs; and at least one substrate having one or more drive electrodes for driving the four proof masses along the radial lines at a drive frequency, wherein a resonant frequency of a sense mode is different from the drive frequency.

Example 2 includes the MEMS sensor of Example 1, wherein the sense combs are oriented such that the gap between adjacent comb fingers does not vary when the proof masses oscillate along the radial lines.

Example 3 includes the MEMS sensor of any of Examples 1-2, wherein the MEMS sensor vibrates with zero angular momentum and zero linear momentum.

Example 4 includes the MEMS sensor of any of Examples 1-3, wherein each proof mass is coupled to adjacent proof masses through proof mass flexures, wherein each proof mass is coupled to the supportive substrate through substrate flexures.

Example 5 includes the MEMS sensor of any of Examples 1-4, wherein each proof mass is driven out of phase with adjacent proof masses.

Example 6 includes the MEMS sensor of any of Examples 1-5, wherein the at least one substrate comprise an upper substrate and a lower substrate, wherein the four proof masses are positioned between the upper substrate and the lower substrate.

Example 7 includes the MEMS sensor of Example 6, wherein electrodes positioned on the upper substrate and lower substrate drive horizontal drive combs on the four proof masses.

Example 8 includes the MEMS sensor of any of Examples 1-7, wherein the MEMS sensor is a Coriolis vibratory gyroscope.

Example 9 includes a method for operating a MEMS sensor, the method comprising: driving four proof masses, wherein each proof mass is driven by a plurality of drive combs, such that the four proof masses oscillate at a drive frequency along radial lines extending from the center of the MEMS sensor through the center of the respective proof mass; and sensing vibration of the four proof masses in a sense mode, wherein the resonant frequency of the sense mode is different from the drive frequency.

Example 10 includes the method of Example 9, wherein sensing vibration of the four proof masses is performed by a plurality of sense electrodes attached to at least one substrate, where the sense electrodes sense motion of sense combs formed on the four proof masses.

Example 11 includes the method of Example 10, wherein the at least one substrate comprise an upper substrate and a lower substrate, wherein the four proof masses are positioned between the upper substrate and the lower substrate.

Example 12 includes the method of Example 11, wherein electrodes positioned on the upper substrate and lower substrate drive the drive combs on the four proof masses.

Example 13 includes the method of any of Examples 10-12, wherein the sense combs are oriented such that the gap between adjacent comb fingers does not vary when the proof masses oscillate along the radial lines.

Example 14 includes the method of any of Examples 9-13, wherein the MEMS sensor vibrates with zero angular momentum and zero linear momentum.

Example 15 includes the method of any of Examples 9-14, wherein each proof mass is coupled to adjacent proof masses through proof mass flexures, wherein each proof mass is coupled to the supportive substrate through substrate flexures.

Example 16 includes the method of any of Examples 9-15, wherein each proof mass is driven out of phase with adjacent proof masses.

Example 17 includes the method of any of Examples 9-16, wherein the MEMS sensor is a Coriolis vibratory gyroscope.

Example 18 includes a MEMS sensor, the MEMS sensor comprising: four proof masses, wherein each proof mass is driven such that the proof masses oscillate along radial lines extending from the center of the MEMS sensor through the center of the respective proof mass, each proof mass comprising: a plurality of drive combs; and a plurality of sense combs; at least one substrate having one or more drive electrodes for driving the four proof masses along the radial lines at a drive frequency, wherein a resonant frequency of a sense mode is different from the drive frequency; and a plurality of flexures that couple each proof mass to adjacent proof masses and couple the four proof masses to the supportive substrate.

Example 19 includes the MEMS sensor of Example 18, wherein the sense combs are oriented such that the gap between adjacent comb fingers does not vary when the proof masses oscillate along the radial lines.

Example 20 includes the MEMS sensor of any of Examples 18-19, wherein the MEMS sensor vibrates with zero angular momentum and zero linear momentum.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

The invention claimed is:

1. A MEMS sensor, the MEMS sensor comprising:
   four proof masses, wherein each proof mass is driven such that the proof masses oscillate along radial lines extending from a center of the MEMS sensor through a center of the respective proof mass, each proof mass comprising:
      a plurality of horizontal drive combs; and
      a plurality of sense combs; and
   an upper substrate and a lower substrate, wherein the four proof masses are positioned between the upper substrate and the lower substrate;
   one or more drive electrodes positioned on the upper substrate and the lower substrate, wherein the one or more drive electrodes drive the four proof masses along the radial lines at a drive frequency, wherein a resonant frequency of a sense mode is different from the drive frequency;
   wherein the drive electrodes positioned on the upper substrate and the lower substrate drive the horizontal drive combs on the four proof masses;
   wherein a drive mode motion of the proof masses has zero total linear momentum and zero total angular momentum;
   wherein a sense mode motion of the proof masses has zero total linear momentum and zero total angular momentum;
   wherein each proof mass is driven out of phase with adjacent proof masses.

2. The MEMS sensor of claim 1, wherein the sense combs include a plurality of comb fingers, the sense combs oriented such that a gap between adjacent comb fingers does not vary when the proof masses oscillate along the radial lines.

3. The MEMS sensor of claim 1, wherein the MEMS sensor vibrates with zero angular momentum and zero linear momentum.

4. The MEMS sensor of claim 1, wherein each proof mass is coupled to adjacent proof masses through proof mass flexures, wherein each proof mass is coupled to each of the substrates through substrate flexures.

5. The MEMS sensor of claim 1, wherein each proof mass is driven out of phase with adjacent proof masses.

6. The MEMS sensor of claim 1, wherein the MEMS sensor is a Coriolis vibratory gyroscope.

7. A method for operating a MEMS sensor, wherein the MEMS sensor comprises:
   four proof masses, each proof mass comprising:
      a plurality of horizontal drive combs; and
      a plurality of sense combs; and
   an upper substrate and a lower substrate, wherein the four proof masses are positioned between the upper substrate and the lower substrate; and
   one or more drive electrodes positioned on the upper substrate and the lower sub state;
the method comprising:
   driving the four proof masses, wherein each proof mass is driven by the plurality of horizontal drive combs, such that the four proof masses oscillate at a drive frequency along radial lines extending from a center of the MEMS sensor through a center of the respective proof mass; and
   sensing vibration of the four proof masses in a sense mode, wherein a resonant frequency of the sense mode is different from the drive frequency;
   wherein the drive electrodes positioned on the upper substrate and the lower substrate drive the horizontal drive combs on the four proof masses;
   wherein a drive mode motion of the proof masses has zero total linear momentum and zero total angular momentum;
   wherein a sense mode motion of the proof masses has zero total linear momentum and zero total angular momentum;
   wherein each proof mass is driven out of phase with adjacent proof masses.

8. The method of claim 7, wherein sensing vibration of the four proof masses is performed by a plurality of sense electrodes attached to at least one of the substrates, where the sense electrodes sense a motion of sense combs formed on the four proof masses.

9. The method of claim 8, wherein the sense combs include a plurality of comb fingers, the sense combs oriented such that a gap between adjacent comb fingers does not vary when the proof masses oscillate along the radial lines.

10. The method of claim 7, wherein the MEMS sensor vibrates with zero angular momentum and zero linear momentum.

11. The method of claim 7, wherein each proof mass is coupled to adjacent proof masses through proof mass flexures, wherein each proof mass is coupled to each of the substrates through substrate flexures.

12. The method of claim 7, wherein each proof mass is driven out of phase with adjacent proof masses.

13. The method of claim 7, wherein the MEMS sensor is a Coriolis vibratory gyroscope.

14. A MEMS sensor, the MEMS sensor comprising:
   four proof masses, wherein each proof mass is driven such that the proof masses oscillate along radial lines extending from a center of the MEMS sensor through a center of the respective proof mass, each proof mass comprising:
      a plurality of horizontal drive combs; and
      a plurality of sense combs;
   an upper substrate and a lower substrate, wherein the four proof masses are positioned between the upper substrate and the lower substrate;
   one or more drive electrodes positioned on the upper substrate and the lower substrate, wherein the one or more drive electrodes drive the four proof masses along the radial lines at a drive frequency, wherein a resonant frequency of a sense mode is different from the drive frequency; and
   a plurality of flexures that couple each proof mass to adjacent proof masses and couple the four proof masses to the upper and lower substrates;
   wherein the drive electrodes positioned on the upper substrate and the lower substrate drive the horizontal drive combs on the four proof masses;
   wherein a drive mode motion of the proof masses has zero total linear momentum and zero total angular momentum;

wherein a sense mode motion of the proof masses has zero total linear momentum and zero total angular momentum;

wherein each proof mass is driven out of phase with adjacent proof masses.

15. The MEMS sensor of claim 14, wherein the sense combs include a plurality of comb fingers, the sense combs oriented such that a gap between adjacent comb fingers does not vary when the proof masses oscillate along the radial lines.

16. The MEMS sensor of claim 14, wherein the MEMS sensor vibrates with zero angular momentum and zero linear momentum.

* * * * *